No. 627,057. Patented June 13, 1899.
J. J. GAVIN.
LINE CHALKER.
(Application filed Dec. 28, 1898.)
(No Model.)
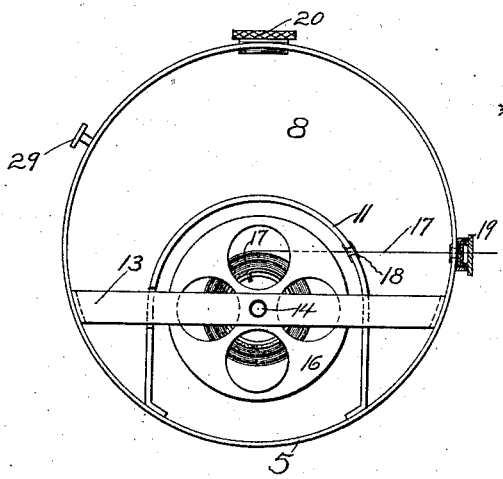
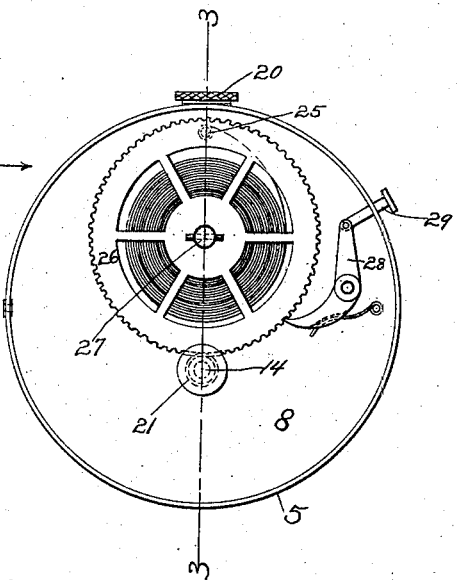
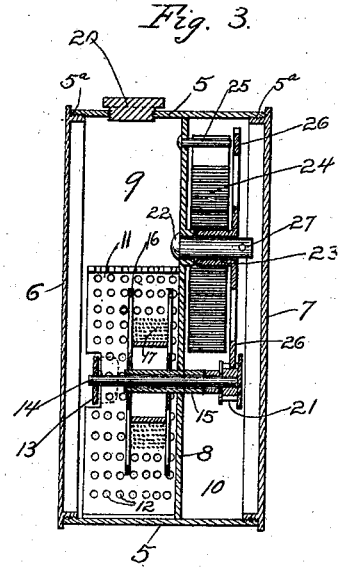
WITNESSES
INVENTOR
John J. Gavin
BY
Edgar Tate & Co.
ATTORNEYS

UNITED STATES PATENT OFFICE.

JOHN JAMES GAVIN, OF NEW YORK, N. Y.

LINE-CHALKER.

SPECIFICATION forming part of Letters Patent No. 627,057, dated June 13, 1899.

Application filed December 28, 1898. Serial No. 700,502. (No model.)

*To all whom it may concern:*

Be it known that I, JOHN JAMES GAVIN, a citizen of the United States, residing at New York, (Brooklyn,) in the county of Kings and State of New York, have invented certain new and useful Improvements in Line-Chalkers, of which the following is a full and complete specification, such as will enable those skilled in the art to which it appertains to make and use the same.

This invention relates to chalk-lines, and has particular relation to a housing or casing for chalk-lines which contains a compartment in which the line is stored and which is filled with a pulverized chalk, and a compartment which contains a device for withdrawing the chalk-line into its compartment after use thereof.

The invention is fully disclosed in the following specification, of which the accompanying drawings form a part, in which like figures of reference denote like parts in the several views, and in which—

Figure 1 is a front end view of my device with the front end walls thereof removed. Fig. 2 is a rear end view thereof with the rear end wall removed; and Fig. 3 is a section through the line 3 3 of Fig. 2, looking in the direction of the arrow.

Referring more particularly to the drawings, 5 is a cylindrical casing, of tin, wood, or any suitable material, provided with front and rear end walls 6 and 7, respectively, which have a threaded connection with the casing 5, as shown at 5ª. The casing 5 is designed to hold chalk in a broken or pulverized condition.

A partition-plate 8 passes diametrically through the casing 5 and divides it into front and rear compartments 9 and 10, respectively, of approximately equal size. The front compartment 9 is provided with a segmental supplemental casing 11, which is secured to the casing 5 and is provided with a plurality of fine perforations 12. (Shown in Fig. 3.)

A longitudinal support 13 (shown in full lines in Fig. 1 and in section in Fig. 2) is secured to the casing 5 in compartment 9, passing through the casing 11 in proximity to the end wall 6.

A shaft 14 passes through the partition-plate 8 in the lower part thereof and within the casing 11 and is rigidly mounted in a sleeve 15, which is revolubly mounted in the partition-plate 8, and the shaft 14 is journaled at one end in the support 13, and a drum 16 is rigidly mounted on the sleeve 15 within the compartment 9 and the casing 11, said drum being adapted to hold the coiled chalk-line 17 (shown in black lines in Fig. 1 and sectioned in Fig. 3) and one end of which is secured to the drum 16. The casing 11 prevents lumps of chalk from clogging the operative connection of the drum 16.

The line 17 passes out through an opening 18 in the casing 11 and an opening 19 in the casing 5 and may be unwound from the drum 16 by merely drawing one end thereof through the opening 19. The compartment 9 is also adapted to contain pulverized or broken chalk, which may be passed therein through an opening in the top of the casing 5, which is shown in the drawings as closed by a screw-cap 20.

The opening at 19 is provided with a stuffing-box, as shown in Fig. 1 at 19ª, and the stuffing-box 19ª is preferably provided with a strip of cloth or other soft fabric, through an opening in which the line 17 is drawn and the surplus powdered chalk removed therefrom.

The end of the shaft 14, which projects into the compartment 10, is provided with a pinion 21, and mounted in said compartment 10 above the pinion 21 is a short shaft or stud 22, which is rigidly secured in the partition-plate 8 and bears a revoluble sleeve 23, encircling which is mounted a coiled spring 24, the inner end of which is secured to the sleeve 23 and the outer end of which is secured to a pin 25, secured in the partition-plate 8. A gear-wheel 26 is mounted on and connected with the sleeve 23 exteriorly of the spring 24 and meshes with the pinion 21 upon the shaft 14. A pin 27 retains the sleeve 23, the gear-wheel 26, and spring 24 in proper position upon the stud 22.

Pivotally mounted upon the rear wall of the casing 5, as shown in Fig. 2, is a spring-pawl 28, which engages the teeth of the gear-wheel 26 and is provided with a pivoted button or pin 29, which passes slidably through the casing 5.

The operation of my device will be evident from the foregoing description when taken in connection with the accompanying drawings and the following statement thereof.

In practice the compartment 9 is filled with pulverized or broken chalk, and when it is desired to use the chalk-line 17 the latter is grasped exteriorly of the casing 5 and the opening 19 therein and drawn from the drum 16. As it passes through the compartment 9 it will receive a coating of chalk therein and will also receive this coating to a certain extent within the casing 11, into which the chalk will sift through the perforations 12 in the said casing 11. The supplemental casing forms a shield or guard for the drum and line, and chalk, both pulverized and broken, may be thrown into the casing 5 and will be gradually reduced to proper pulverized condition by the handling of the device. The perforated casing also regulates the feeding of the pulverized chalk to the drum, as it prevents a sudden massing of the chalk in the vicinity of the drum and line. As the line 17 is drawn out it will revolve the drum 16, the sleeve 15, and the shaft 14, and also the pinion 21, which latter in turn will revolve the gear-wheel 26 and the sleeve 23 and wind up the spring 24. The pawl 28 will lock the gear-wheel 26 when tension ceases upon the line 17, and will also lock the pinion 21, the shaft 14, the sleeve 15, and the drum 16, which are all in operative connection with the gear-wheel 26, as described. It is evident that upon pressing the pin 29 the pawl 28 will be withdrawn from the gear-wheel 26 and the spring 24 will expand reversely, revolving the collar 23, the gear-wheel 26, the pinion 21, the shaft 14, collar 15, and drum 16, rewinding the line 17 upon the drum 16.

Having fully described my invention, I claim as new and desire to secure by Letters Patent—

1. In a device of the class described, provided with a casing designed to hold chalk, a supplemental perforated casing mounted within said casing, and a drum revolubly mounted within said supplemental casing and adapted to hold a chalk-line, substantially as shown and described.

2. A device of the class described, comprising a casing provided with a transverse partition forming a front and rear compartment in said casing, a supplemental perforated casing mounted in said front compartment, a shaft revolubly mounted in said casing and passing through said partition, a drum rigidly secured to said shaft and within said supplemental casing and adapted to hold a chalk-line which is secured thereto, a pinion rigidly secured to said shaft in said rear compartment, a stud mounted in said rear compartment, and provided with a revoluble sleeve, a coil-spring mounted upon said sleeve, a gear-wheel rigidly mounted upon said sleeve, one end of said spring being secured to said casing and the other end to said sleeve, and a pivoted pawl mounted on said casing and adapted to engage said gear-wheel, substantially as shown and described.

3. In a device of the class described, a casing designed to hold pulverized chalk, a drum mounted therein, a chalk-line adapted to be wound upon said drum, and an opening in said casing provided with a stuffing-box having a perforated strip of textile material through which said chalk-line may be drawn, substantially as shown and described.

4. In a device of the class described, provided with a casing designed to hold chalk, a supplemental perforated casing mounted within said casing, a drum revolubly mounted within said supplemental casing and adapted to hold a chalk-line, a coiled spring mounted in said casing and in operative connection with said drum, and adapted to turn said drum so as to wind up said line, substantially as shown and described.

In testimony that I claim the foregoing as my invention I have signed my name, in presence of the subscribing witnesses, this 22d day of December, 1898.

JOHN JAMES GAVIN.

Witnesses:
JOHN TOSTEVIN,
EDWARD F. HAUBT.